(12) United States Patent
Von Deylen

(10) Patent No.: US 11,258,397 B2
(45) Date of Patent: Feb. 22, 2022

(54) SOLAR MODULE MOUNTING SYSTEM

(71) Applicant: AP Alternatives, LLC, Ridgeville Corners, OH (US)

(72) Inventor: Josh Von Deylen, Bryan, OH (US)

(73) Assignee: AP ALTERNATIVES, LLC, Ridgeville Corners, OH (US)

( * ) Notice: Subject to any disclaimer, the term of this patent is extended or adjusted under 35 U.S.C. 154(b) by 0 days.

(21) Appl. No.: 16/787,307

(22) Filed: Feb. 11, 2020

(65) Prior Publication Data

US 2021/0249986 A1 Aug. 12, 2021

(51) Int. Cl.
*H02S 20/10* (2014.01)
*F16B 5/06* (2006.01)
*H02S 20/20* (2014.01)

(52) U.S. Cl.
CPC .......... *H02S 20/10* (2014.12); *F16B 5/0635* (2013.01); *F16B 5/0685* (2013.01); *H02S 20/20* (2014.12)

(58) Field of Classification Search
CPC ........ H02S 20/10; H02S 20/20; F16B 5/0635; F16B 5/0685
See application file for complete search history.

(56) References Cited

U.S. PATENT DOCUMENTS

| | | | | |
|---|---|---|---|---|
| 1,656,044 A * | 1/1928 | Cibulas | ...................... | E04D 3/08 52/95 |
| 6,672,018 B2 * | 1/2004 | Shingleton | .............. | H02S 20/23 52/173.3 |
| 7,634,875 B2 * | 12/2009 | Genschorek | ............ | H02S 20/23 52/173.3 |
| 8,181,926 B2 * | 5/2012 | Magno, Jr. | ............ | F24S 25/636 248/237 |
| 8,407,895 B2 * | 4/2013 | Hartelius | ................ | F24S 25/40 29/890.033 |
| 8,413,944 B2 * | 4/2013 | Harberts | ................. | F24S 25/33 248/500 |
| 8,505,864 B1 * | 8/2013 | Taylor | ................... | F24S 25/636 248/237 |
| 8,572,909 B2 * | 11/2013 | Rivera | .................. | F24S 25/636 52/173.3 |
| 8,590,223 B2 | 11/2013 | Kilgore | | |
| 8,713,881 B2 | 5/2014 | DuPont | | |
| 8,745,935 B2 | 6/2014 | DuPont | | |
| 8,894,424 B2 | 11/2014 | DuPont | | |
| 8,925,263 B2 * | 1/2015 | Haddock | ................. | F16B 2/065 52/173.3 |
| 8,955,259 B2 | 2/2015 | Hemingway | | |
| 9,051,950 B2 * | 6/2015 | Jaffari | ...................... | F16B 2/065 |
| 9,068,764 B2 * | 6/2015 | Moore | .................... | H02S 30/10 |
| 9,097,443 B2 * | 8/2015 | Liu | ........................ | F24S 25/33 |
| 9,281,778 B2 * | 3/2016 | Corio | .................... | F24S 25/634 |
| 9,331,629 B2 | 5/2016 | Cheung | | |
| 9,416,992 B2 * | 8/2016 | Braunstein | ............. | H02S 20/23 |
| 9,425,732 B2 * | 8/2016 | Durney | .................. | H02S 20/10 |
| 9,506,600 B1 * | 11/2016 | Li | .......................... | F24S 25/65 |
| 9,553,544 B2 * | 1/2017 | Nayar | .................... | H02S 20/30 |
| 9,660,570 B2 * | 5/2017 | Stephan | ................. | H02S 20/20 |
| 9,876,465 B2 * | 1/2018 | Depauw | ................. | F16B 5/0685 |
| 9,893,436 B2 * | 2/2018 | Martin | .................... | H01R 4/26 |

(Continued)

*Primary Examiner* — Stanton L Krycinski
(74) *Attorney, Agent, or Firm* — Jacob M. Ward; Ward Law Office LLC

(57) ABSTRACT

A mounting system for a solar module that uses a resilient clip to locate and secure the solar module in a desired location.

20 Claims, 15 Drawing Sheets

(56) References Cited

U.S. PATENT DOCUMENTS

| | | | | |
|---|---|---|---|---|
| 10,020,411 B2* | 7/2018 | Beck | ............... | F24S 25/617 |
| 10,069,455 B2* | 9/2018 | Corio | ............... | F24S 30/425 |
| 10,205,418 B2* | 2/2019 | Nayar | ............... | F24S 25/613 |
| 10,364,567 B2* | 7/2019 | Shang | ............... | H02S 20/20 |
| 10,644,644 B2* | 5/2020 | Dick | ............... | H02S 20/00 |
| 10,749,459 B1* | 8/2020 | Liu | ............... | F24S 25/636 |
| 2003/0177706 A1* | 9/2003 | Ullman | ............... | F24S 25/636 |
| | | | | 52/3 |
| 2013/0167907 A1* | 7/2013 | Bitarchas | ............... | F24S 25/636 |
| | | | | 136/251 |
| 2014/0151312 A1* | 6/2014 | Cusson | ............... | H02S 40/36 |
| | | | | 211/41.1 |
| 2015/0200621 A1* | 7/2015 | Reed | ............... | H02S 20/20 |
| | | | | 248/229.17 |
| 2018/0294768 A1* | 10/2018 | Wang | ............... | F24S 25/632 |
| 2019/0178274 A1* | 6/2019 | Katz | ............... | F16B 7/187 |
| 2020/0313604 A1* | 10/2020 | Harris | ............... | H02S 30/00 |

\* cited by examiner

SOLAR MODULE MOUNTING SYSTEM

CROSS-REFERENCE

The present patent application is based upon and claims the benefit of provisional patent No. 62/805,352, filed Feb. 14, 2019.

BACKGROUND OF THE INVENTION

The invention is a mounting system for a solar module. The system uses a resilient clip that allows the solar module to hung in a mounting position in a clamp and then engages the solar module to hold the solar module in the desired location.

Prior art mounting systems for solar modules do not provide a clip that allows hanging and then engaging the solar module. The mounting system of the present invention simplifies the positioning and securing of the solar modules with respect to a mounting rack.

SUMMARY OF THE INVENTION

A mounting system for a solar module that uses a resilient clip to locate and secure the solar module in a desired location.

DETAILED DESCRIPTION OF THE INVENTION

Figure 1:
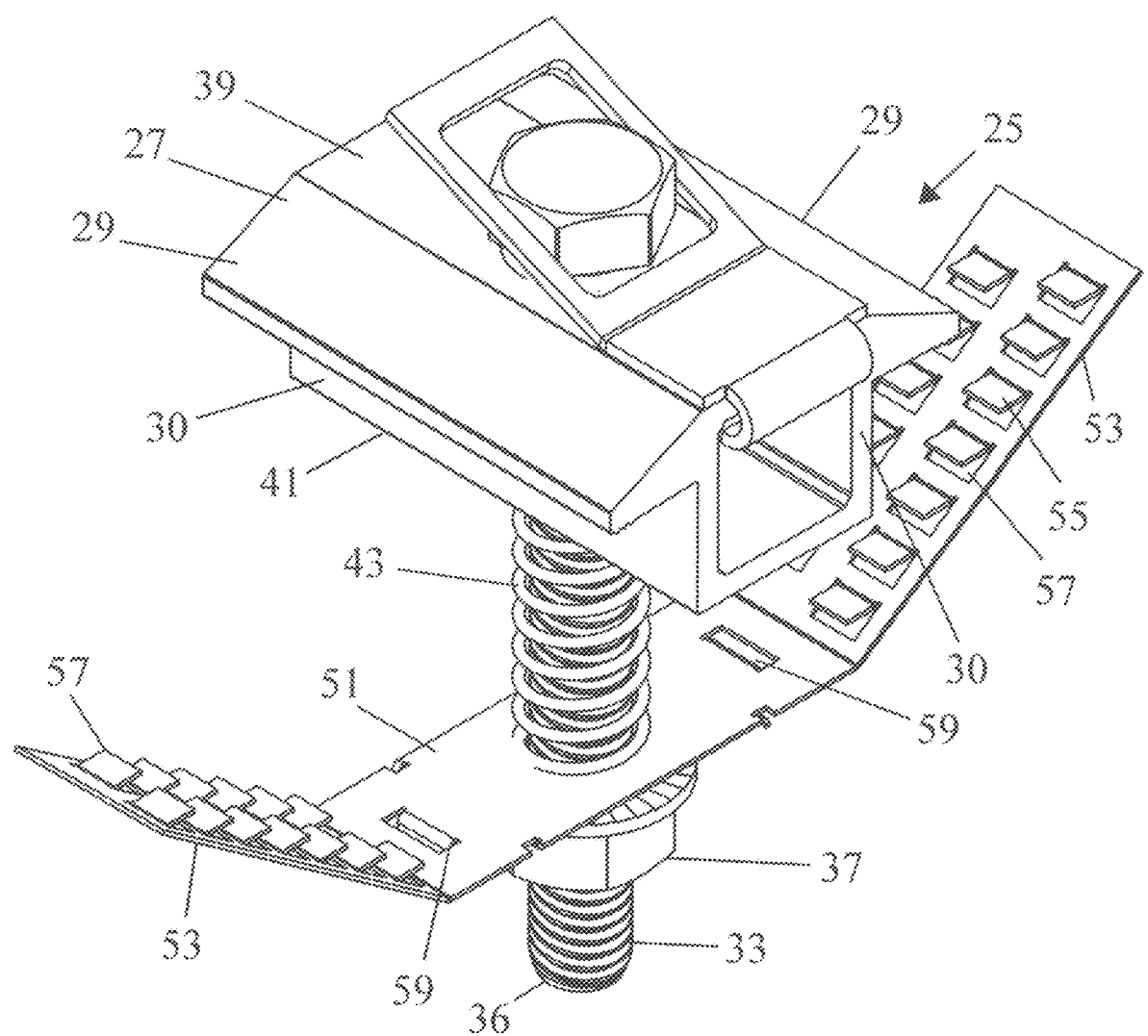
FIG. 1 is a side elevational perspective view of the invention.
Figure 2:
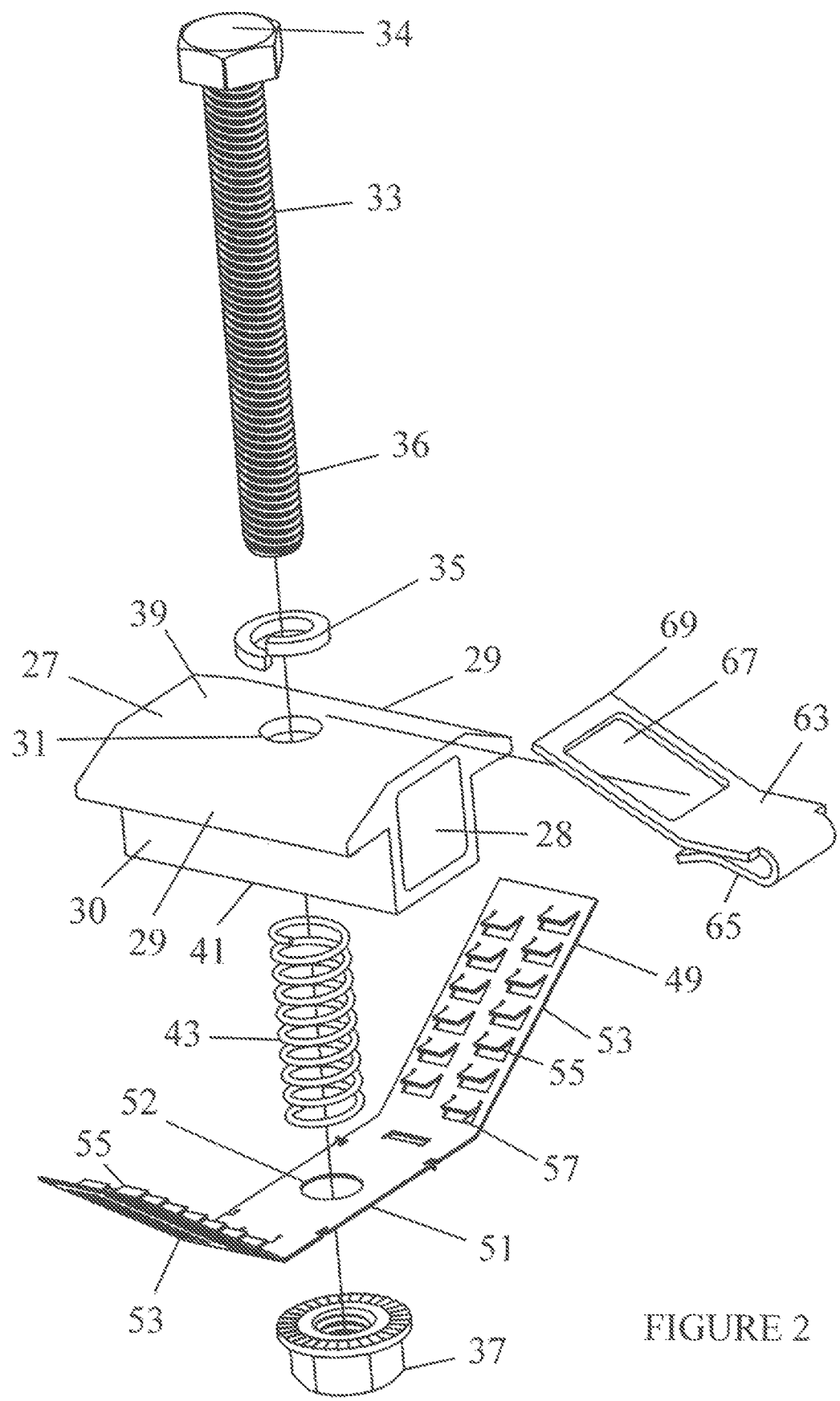
FIG. 2 is an exploded view of FIG. 1.
Figure 3:
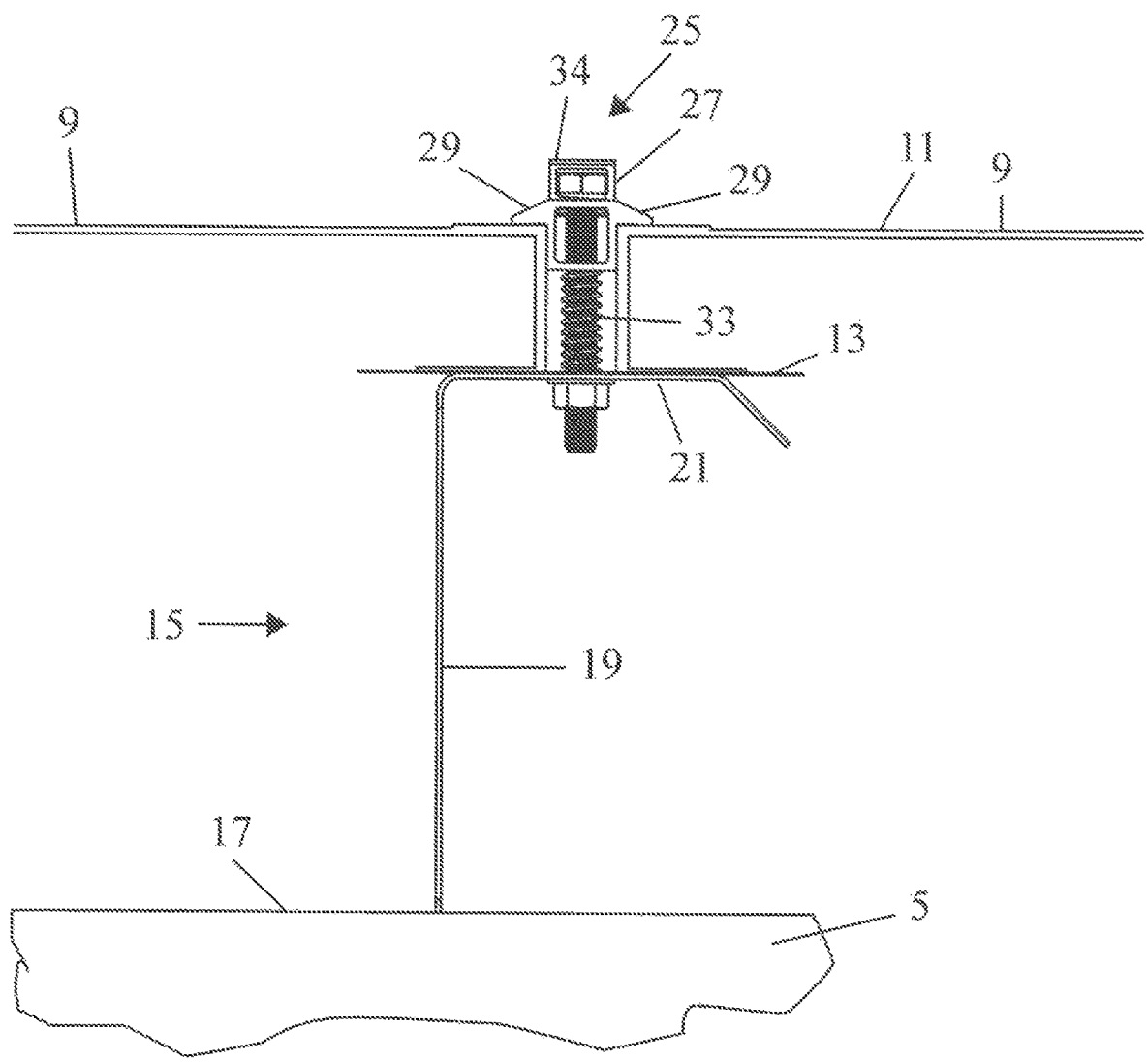
FIG. 3 is a side elevational view of the invention mounted on a structure.
Figure 4:
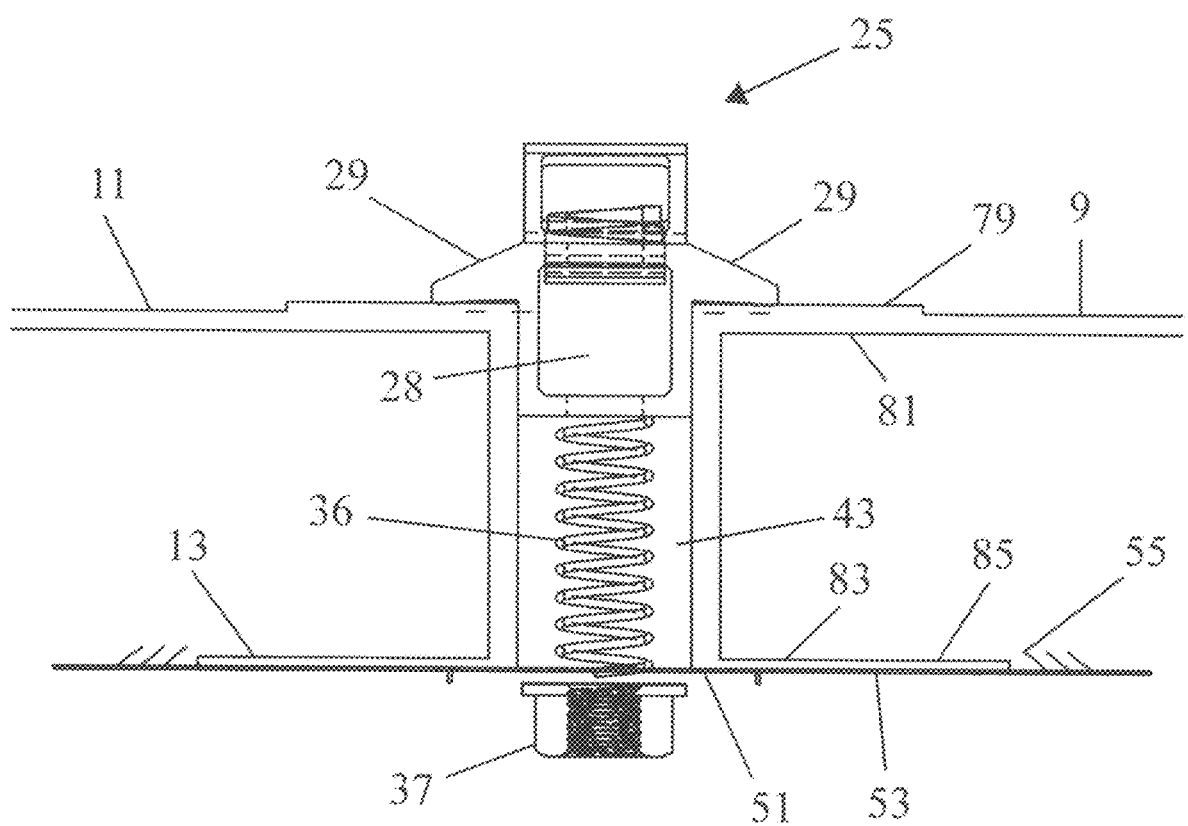
FIG. 4 is a partial exploded view of FIG. 3.
Figure 5:
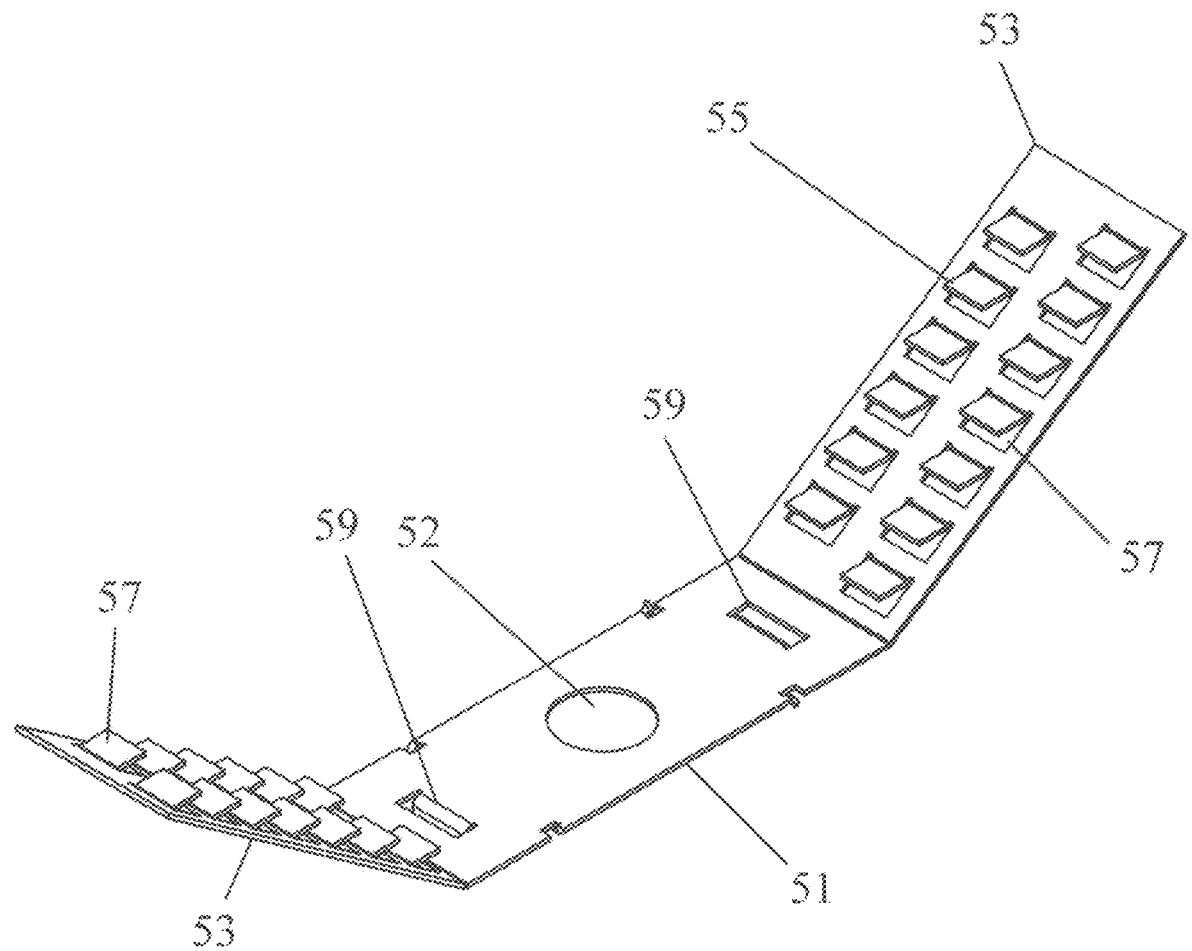
FIG. 5 is a top perspective view of the clip of the invention.
Figure 6:
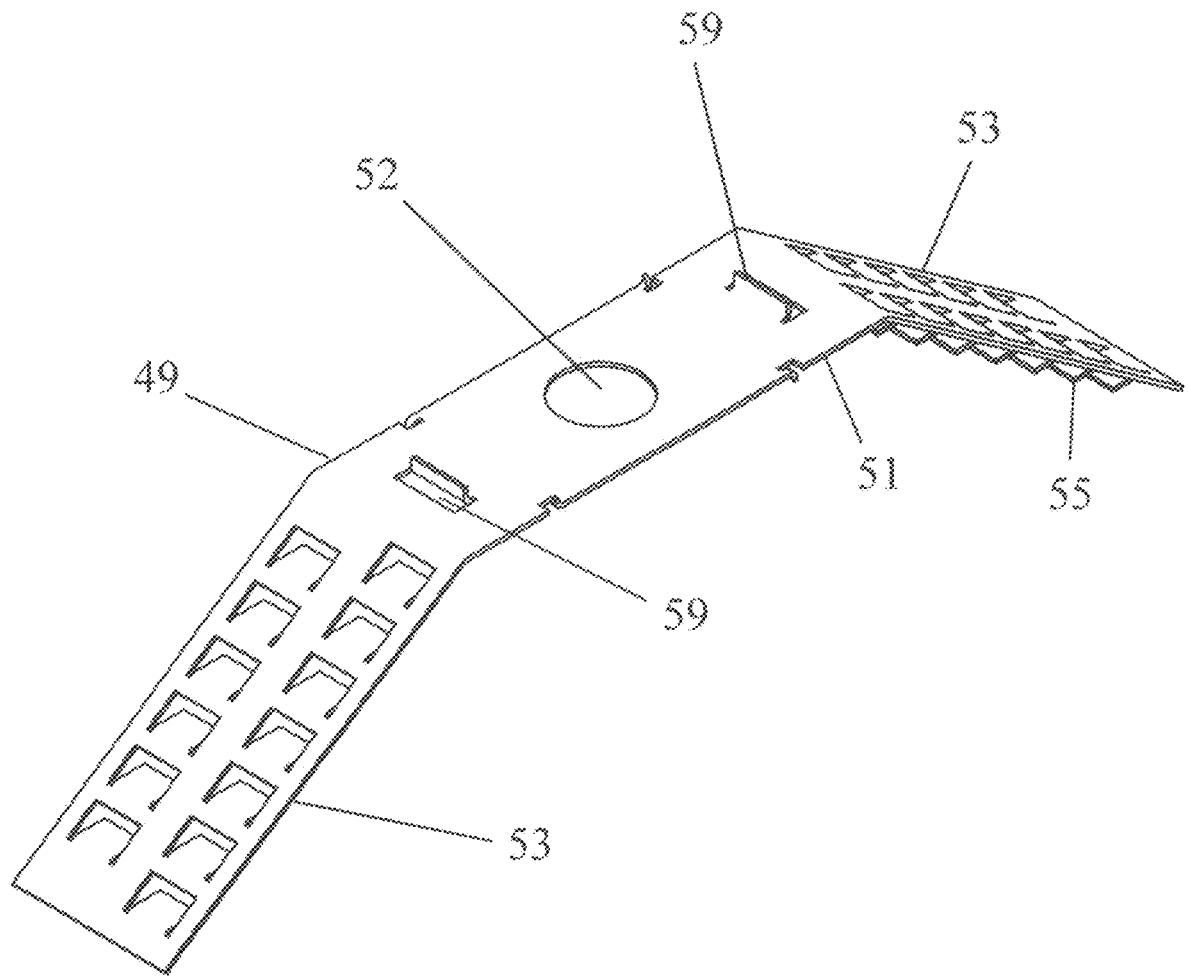
FIG. 6 is a bottom perspective view of the clip.
Figure 7:
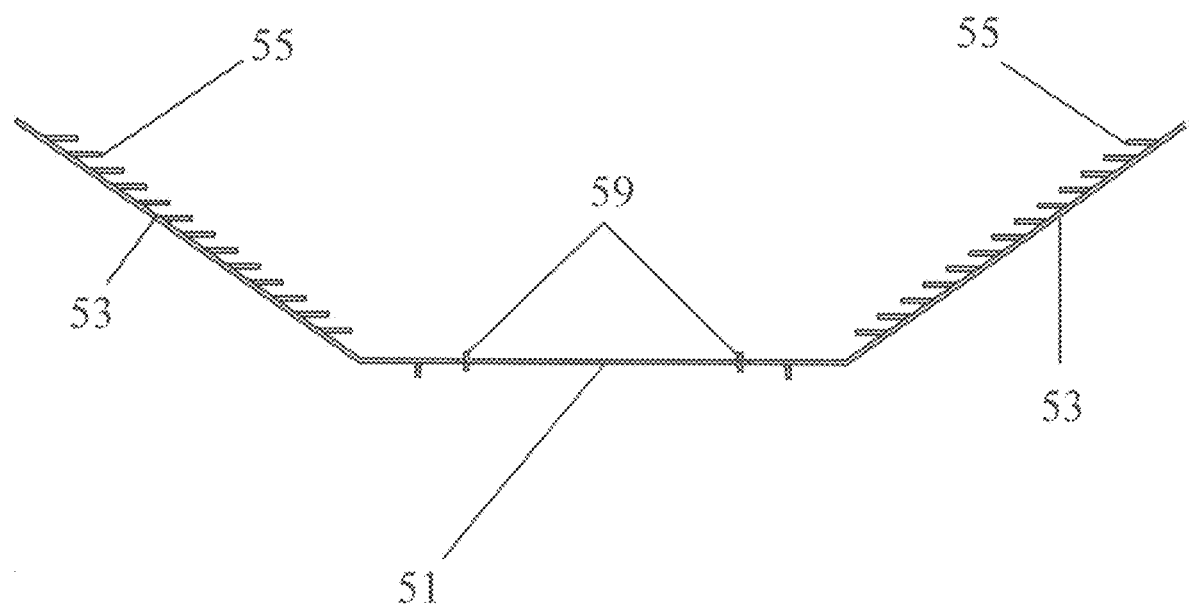
FIG. 7 is a side elevational view of the clip.
Figure 8:
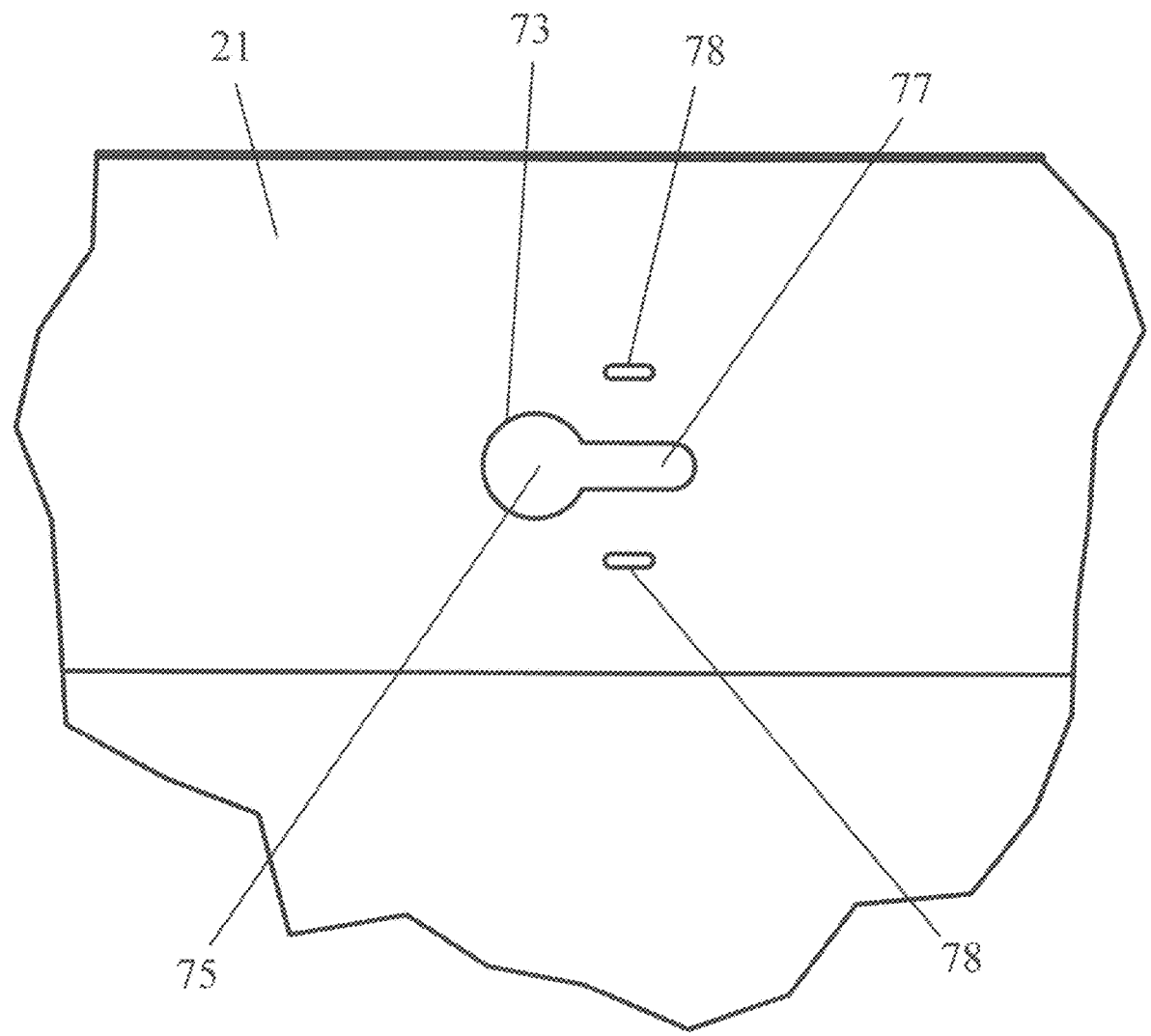
FIG. 8 is a partial bottom view of the mounting rack.
Figure 9:
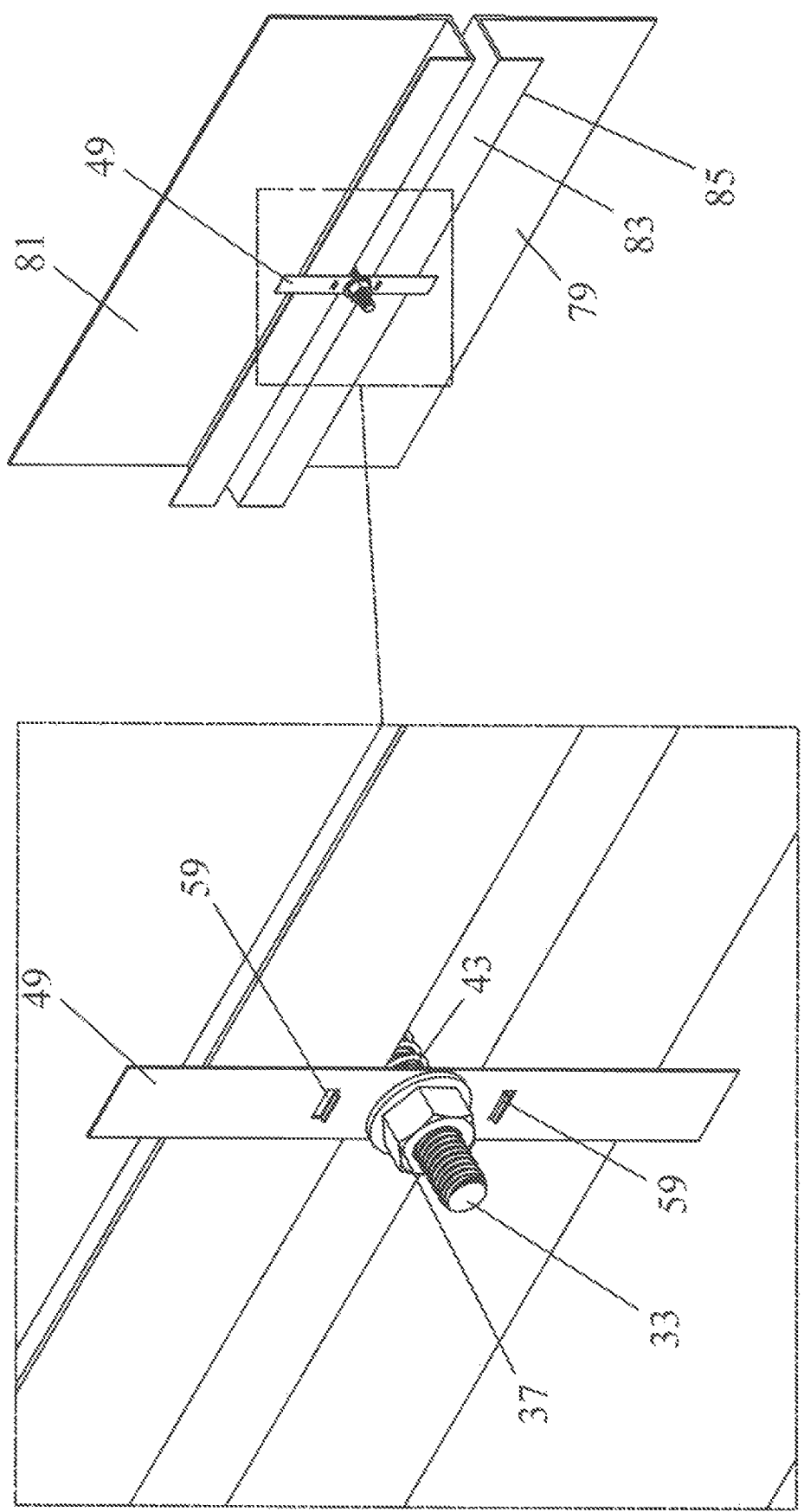
FIG. 9 is a partial perspective view of the invention.

The invention is directed to a clip which can be used to assist in securing solar modules onto a mounting rack. The mounting rack is used to support the solar modules on the ground, on a building or other structure, with the solar modules positioned to gather solar energy. More particularly, the clip is designed to accommodate solar modules of different sizes and configurations to provide a more universal way to mount the solar modules. The features of the invention will be more fully understood by referring to the attached drawings in connection with the following description.

The invention of this patent application, as shown in FIGS. 1-9, is designed to mount solar modules on a structure 5. The mounting system allows the solar modules to be positioned in a first location on a mounting rack 15. The first location allows the solar modules to be quickly located in a temporary position on the mounting rack. When the solar modules are all in the first position, the solar modules are moved to a second location on the mounting rack and the mounting system is engaged to secure the solar modules in the second position on the mounting rack. The first position allows the solar modules to be oriented on the mounting rack and final adjustments made to the position of the solar modules. When the solar modules are in the desired first location, the solar modules are advanced to the second position, where the solar modules can be locked into position by the mounting system. The ability of the mounting system to temporarily hold the solar modules in a first position and to allow for adjustment of the solar modules in this first position increases the flexibility of the mounting system in positioning the solar modules and quickly achieving an acceptable arrangement of the solar modules on the mounting rack. Once this desired temporary location is achieved the solar modules are moved slightly to allow the mounting system to engage the solar modules to hold the solar modules in the second location. Once the solar modules are in the second location the mounting system is engaged to secure the solar modules in the second location. The flexibility provided by the mounting system allows the solar modules to be more efficiently positioned on the mounting rack and reduces the installation time and cost for the solar modules. A mounting rack 15 is positioned on the structure for supporting and locating the solar modules 9. The mounting rack has a base 17 that is secured to the structure 5. A support column 19 extends from the base 17 in a direction away from the structure 5. The support column 19 is positioned to be substantially perpendicular to the base 17. A mounting plate 21 extends from the end of the support column 19 that is spaced apart from the base 17. The mounting plate 21 is disposed to be substantially perpendicular to the support column 19 and substantially parallel to the base.

A clamp 25 is operatively connected to the mounting plate 21 on the rack 15. The clamp has a top bracket 27 with opposed substantially parallel sides 30. Flanges 29 extend from each opposed side 30 of the top bracket. The top bracket is substantially rectangular in shape. There is a hollow portion 28 in the center of the top bracket. An aperture 31 extends through the top bracket 27 from the top 39 through the bottom 41 of the top bracket. The aperture is perpendicular to the longitudinal axis of the top bracket 27. A bolt 33 having a head 34 is positioned in the aperture 31 and extends through the top bracket 27. The head 34 of the bolt 33 is designed to engage the top 39 of the top bracket. A lock washer 35 can be positioned between the head 34 of the bolt 33 in the top 39 of the top bracket 27.

A portion 36 of the bolt 33 extends beyond the bottom 41 of the top bracket 27. A spring 43 is positioned around the portion 36 of the bolt that extends beyond the bottom 41 of the top bracket. One end of the spring is designed to engage the bottom 41 of the top bracket 27. A resilient clip 49, having a center portion 51 with an opening 52, is positioned on the end of the bolt 33 that extends beyond the end of the spring 43 that is spaced apart from the top bracket 27. The other end of the spring is designed to engage the side of the center portion 51 that faces the bottom 41 of the top bracket. The bolt extends from the opening 52 in the center portion 51 of the clip. On each side of the center portion 51 there are resilient legs 53 that extend from the center portion. The clip 49 is made from stainless spring steel or similar material that is resilient and that will return to its original shape if it is displaced from its original shape. The resilient legs 53 are initially disposed at an angle from about 20 degrees to about 30 degrees, with respect to the center portion 51. The resilient legs extend from the center portion 51 in a direction towards the top bracket 27. A plurality of barbs 55 are formed on the resilient legs 53. The barbs extend from the resilient legs 53 in a direction towards the top bracket 27. The barbs terminate in an end 57 that is raised from the resilient legs 53. The barbs extend from the resilient legs a distance from about 0.25 of an inch to about 0.75 of an inch. At least two grounding tabs 59 are formed in the center portion 51 of the clip 49. The at least two grounding tabs extend from the center portion and in a direction towards the top bracket 27. The at least two grounding tabs 59 extend from the center portion in a direction away from the top bracket 27. The grounding tabs are disposed to engage the mounting plate 21 and to function as a ground for the solar module 9. The grounding tabs also function to prevent the clip from rotating with respect to the mounting plate.

A nut 37 is positioned on the end of the bolt 33 that extends through the opening 52 in the center portion 51. The nut is disposed to engage the surface of the mounting plate 21 that is spaced apart from the resilient clip 49. The spring 43 on the bolt 33 resiliently biases the center portion 51 of the clip 49 against the nut 37 and resiliently biases the top bracket 27 against the head 34 of the bolt 33.

A safety spring 63 can be utilized with the clamp 25. The safety spring has a U-shaped portion 65 and one leg of the U-shaped portion extends into the hollow portion 20 of top bracket 27. A resilient flange 69 extends from the U-shaped portion 65 over the top 39 of the top bracket 27. An opening 67 is provided in the resilient flange. The opening 67 is designed to fit around the head 34 of the bolt 33 that extends through the clamp 25. The resilient flange is disposed to extend at an angle, with respect to the head on the bolt. If it is necessary to access the head of the bolt to make adjustments in the clamp 25, the resilient flange 69 is displaced in a direction towards the top 39 of the top bracket 27 to provide access to the head 34 of the bolt 33. The sides 68 of the opening 67 are designed to engage the head 34 of the bolt 33 to assist in preventing the bolt from turning when the safety spring 63 is in the undisplaced position.

A plurality of keyhole-shaped openings 73 are positioned in the mounting plate 21 of the mounting rack 15. The keyhole-shaped openings have a circular section 75 and a slot portion 77 that extends from the circular section 75. The circular section 75 is designed so that the nut 37 can fit through the circular section. The nut extends through the circular section 75 in a direction towards the structure 5. The slot portion 77 is designed to be slightly larger than the diameter of the bolt 33. Accordingly, the bolt 33 can be advanced into the slot portion 77. The diameter of the nut 37 is larger than the width of the slot portion 77 so that the nut will engage the side of the mounting plate 21 that faces the structure 5. The center portion 51 of the clip 49 will engage the side of the mounting plate 20 that is spaced apart from the structure. Alignment slots 78 can be positioned adjacent the slot portion 77. The grounding tabs 59 that extend from the center portion 51 in a direction towards the structure 5 are designed to fit into the alignment slots to properly position the clip 49 with respect to the mounting rack 15. The center portion 51 of the resilient clip can be advanced in a direction towards the top bracket 27 of the clamp 25 by compressing the resilient spring 43 to allow the clamp 25 to be secured in the slot portion 77 of the keyhole-shaped opening 73 in the mounting plate 21.

A solar module 9 is positioned on each side of the clamp 25 to secure the solar modules to the mounting rack 15. Each solar module has a top 11 and a bottom 13. A bracket 79 is positioned on the end of each solar module and the bracket extends along a small portion of the top side and bottom side of each solar module. The top 81 of the bracket extends for a short distance along the top 11 of the solar module 9. The top 81 of the bracket is designed to fit under the flange 29 that extends from each side of the top bracket 27 of the clamp 25. The bottom 83 of the bracket 79 extends along a portion of the bottom 13 of the solar module 9. The bottom of the bracket terminates in an end 85 that is spaced apart a short distance from the end wall of the bracket. The end 85 of the bottom 83 of the bracket 79 is designed to engage an end 57 of the barbs 55 that are positioned on the resilient legs 53 of the clip 49. The resilient legs 53 of the clip 49 can be displaced in a direction towards the mounting plate 21 of the mounting rack 15 to facilitate the positioning of the solar modules 9 in the clamp 25.

In operation, the clamps 25 are mounted on the mounting plate 21 of the mounting rack 15 in the manner previously described. As the mounting rack 15 is secured to the structure 5, this provides a base upon which the solar modules 9 can be suspended or positioned with respect to the structure. The bottom 13 of the solar module engages one of the resilient legs 53 of the clip 49 and the resilient leg is displaced in a direction towards the mounting plate 21. This allows the solar module to be advanced in a direction towards the bolt 33 of the clamp 25 so that the top 81 of the bracket 79 on the end of the solar module can extend under the flange 29 on that side of the top bracket 27 where the solar module is to be positioned. At the same time, the bottom 83 of the bracket 79 is advanced in the resilient leg 53 of the clip 49. The solar modules 9 are positioned in a first position on the resilient leg of the clip. This is a temporary position where the solar modules 9 can be aligned and oriented as desired on the mounting rack. The solar modules are not secured in place in this first position. Once the solar modules are all in the desired first position, the solar modules are advanced slightly towards the bolt 33 to a second position on the mounting rack. Once the solar modules are in the second position, the end 85 of the bottom 83 of the bracket 79 will advance over the barbs 55 until the solar module is in the desired position. At that point one of the barbs 55 on the resilient leg 53 will engage the end 85 of the bracket 79 and resist movement of the solar panel in a direction away from the bolt 33. The resilient leg 53 of the clip 49 will provide a biasing force that presses the bottom 83 of the bracket 79 in a direction towards the top bracket 27 of the clamp 25. This biasing force helps to secure the solar module 9 in the clamp 25. A solar module 9 is usually positioned on each side of the clamp 25. Once the solar modules are in the second position in the clamp 25, the nut 37 on the bolt 33 can be advanced in a direction towards the top bracket 27 to further secure the solar modules 9 in the clamp 25. Advancing the nut 37 in a direction towards the top bracket 27 also helps to secure the bolt 33 in the slot portion 77 of the keyhole-shaped opening 73 in the mounting plate 21 of the mounting rack 15. A grounding tab 59 in the center portion 51 of the clip 49 engages the bottom 13 of the solar module 9 and a grounding tab 59 in the center portion 51 engages the mounting plate 21 of the mounting rack 15. This engagement of the grounding tabs 59 allows for an electrical grounding path for the solar modules.

Figure 10:
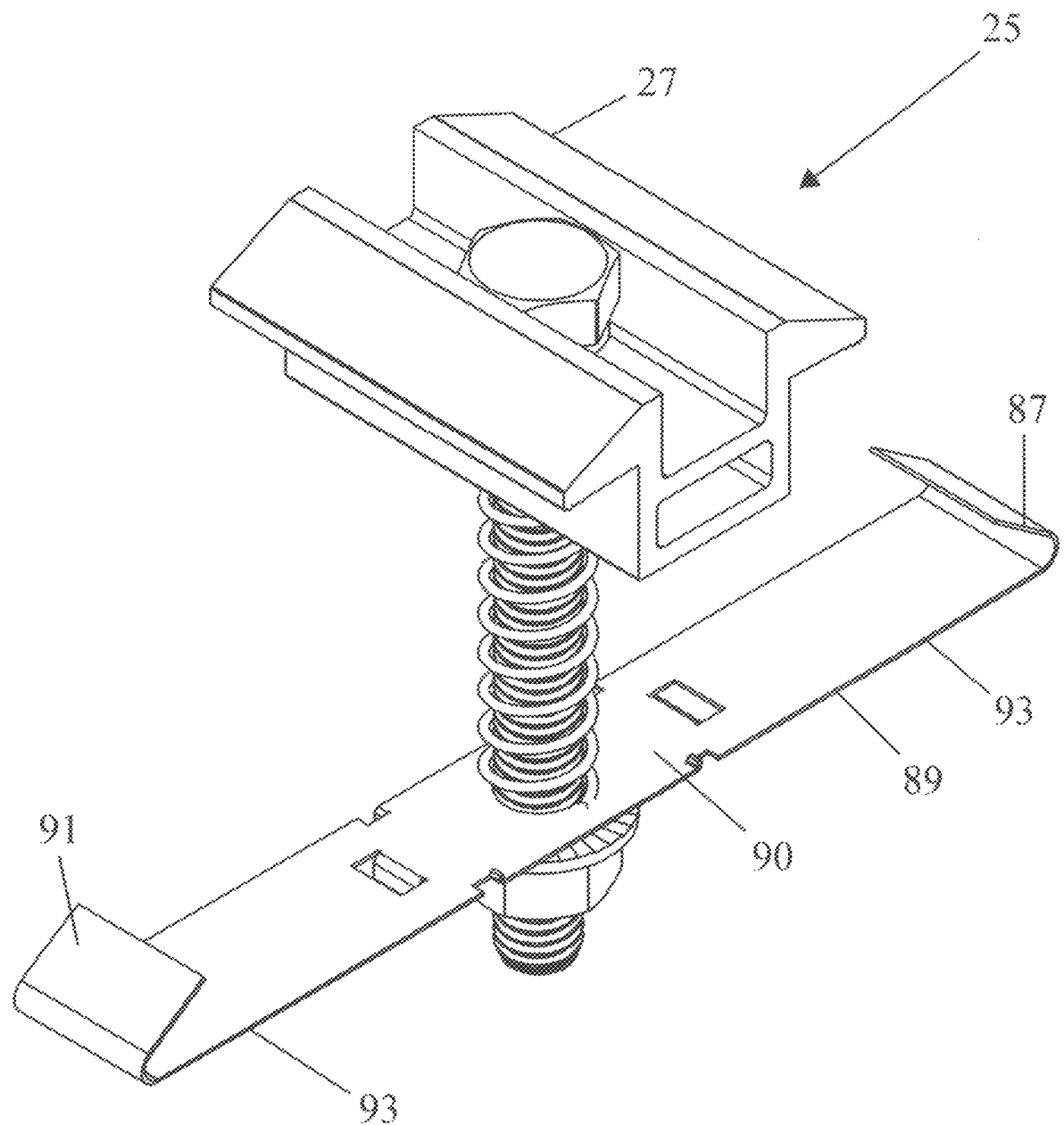
FIG. 10 is a partial perspective view of the clamp.
Figure 11:
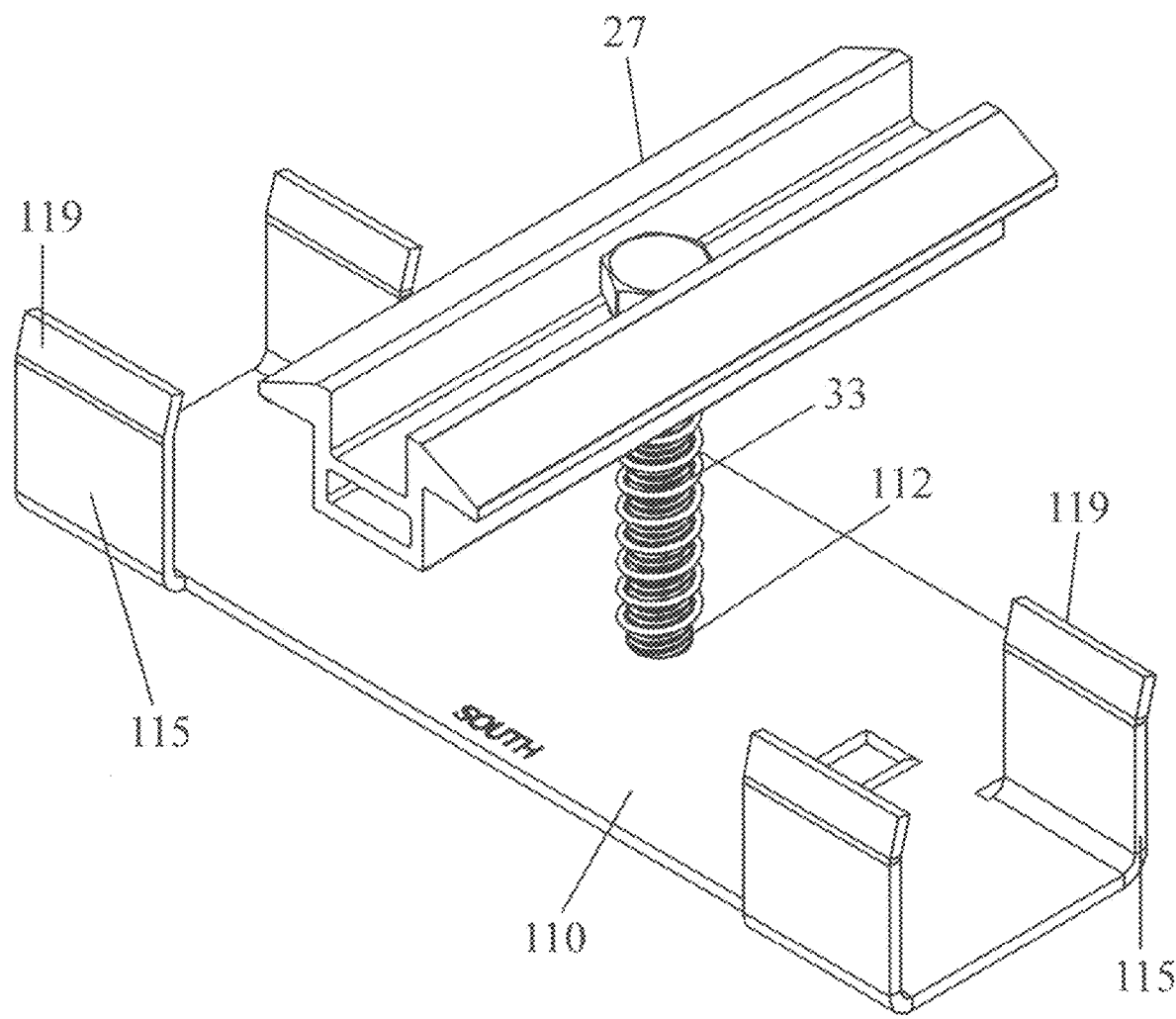
FIG. 11 is a perspective view of the clamp.
Figure 12:
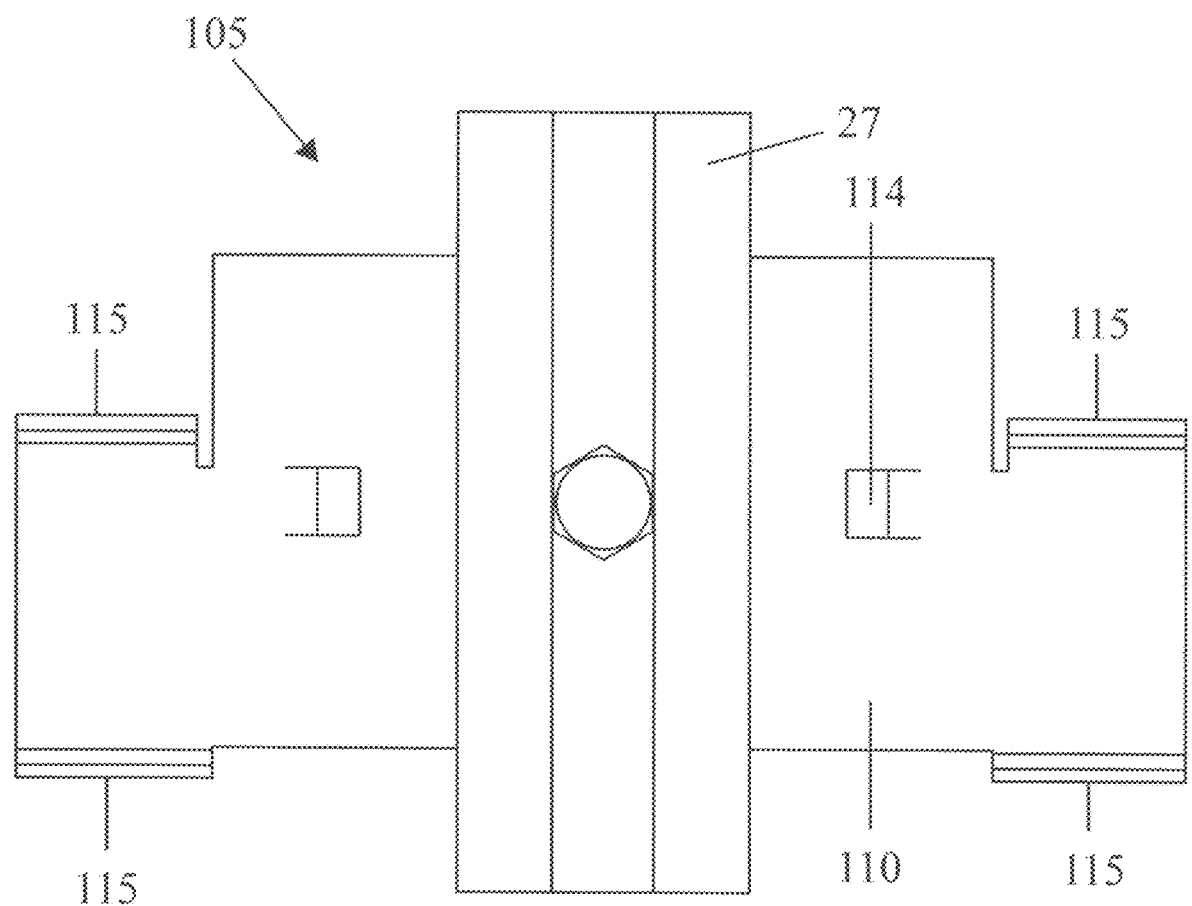
FIG. 12 is a top view of the clamp of the present invention.
Figure 13:
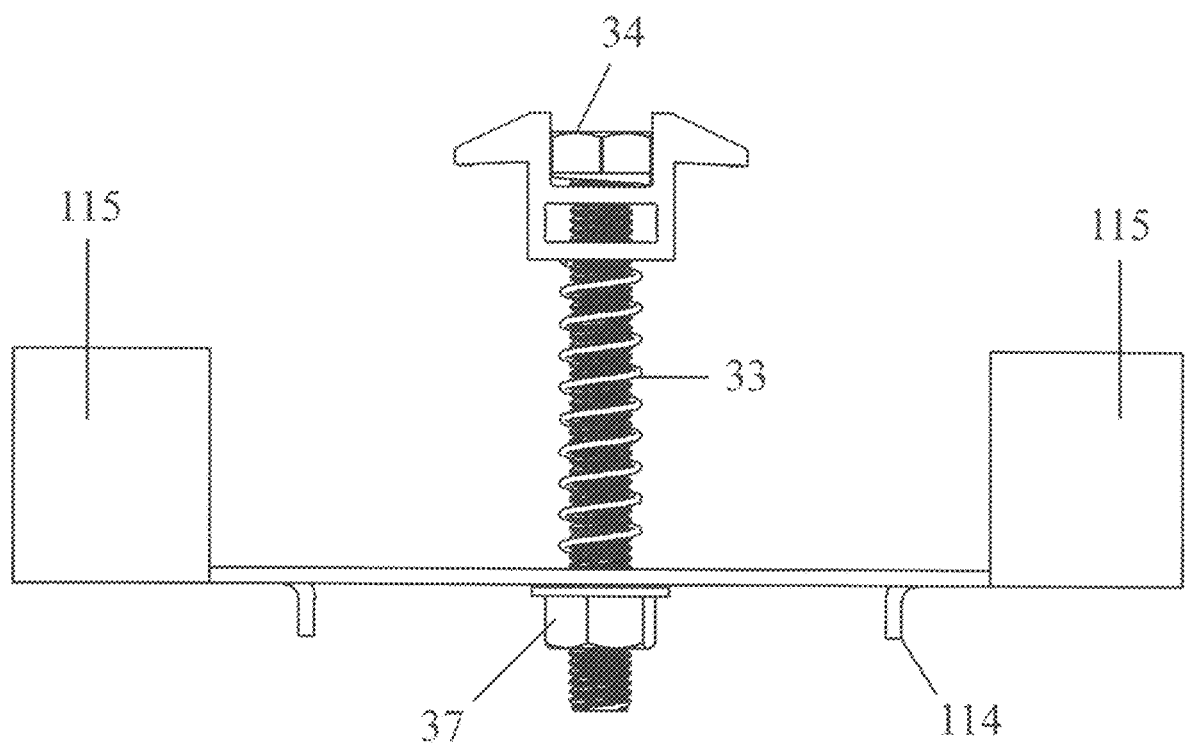
FIG. 13 is a partial perspective view of the clamp.
Figure 14:
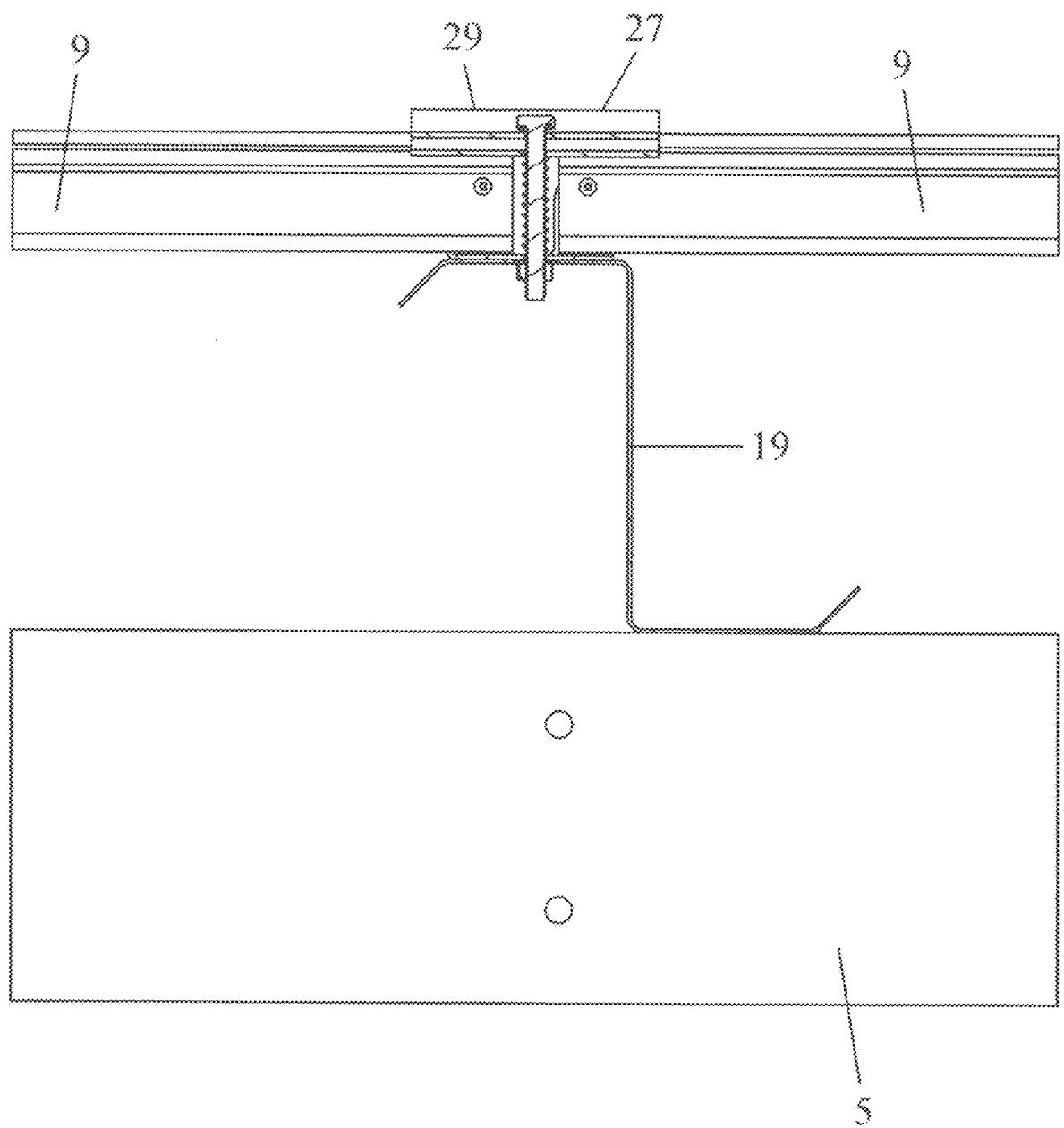
FIG. 14 is a side elevational view of the invention.
Figure 15:
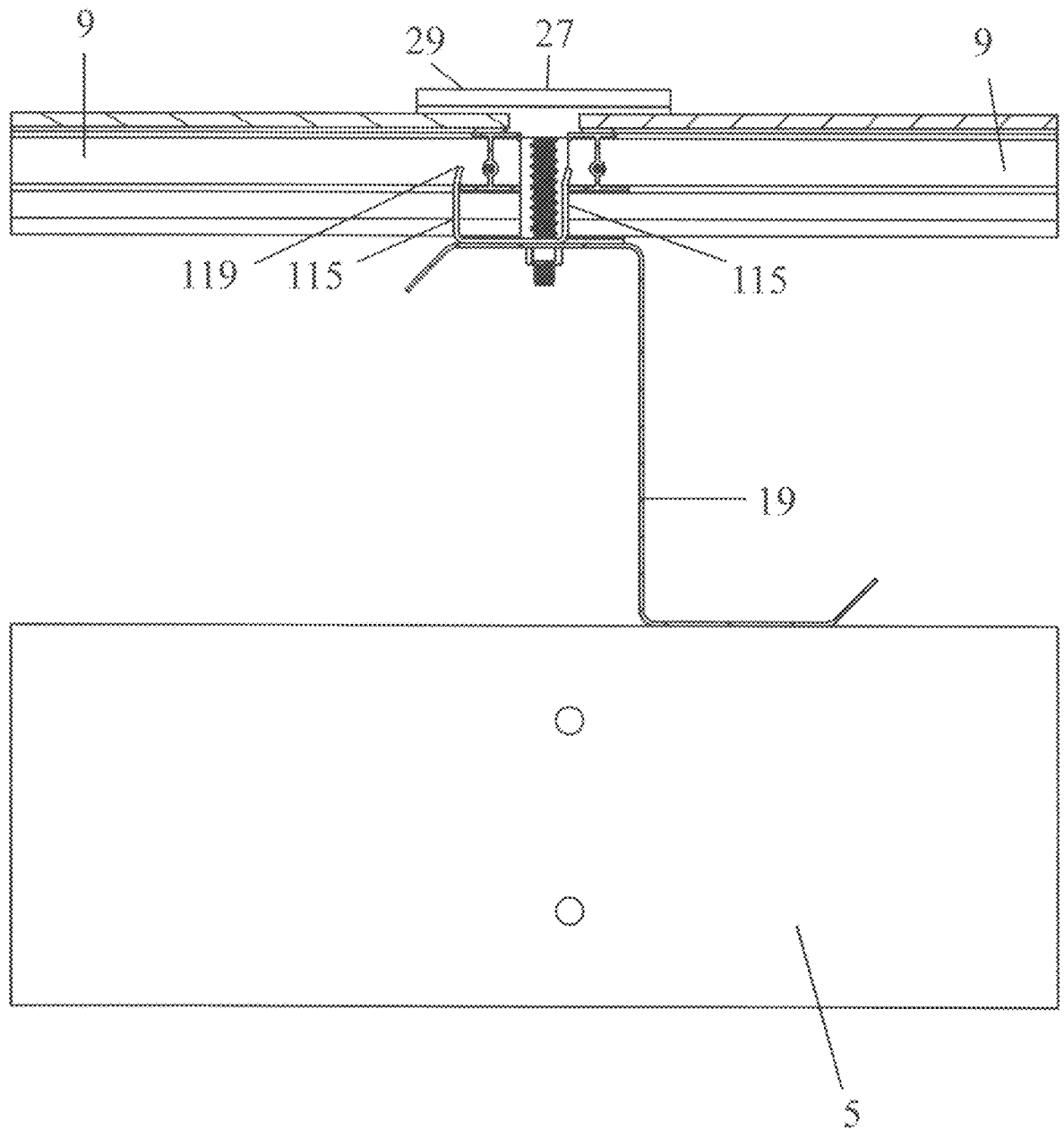
FIG. 15 is a side elevational view.

FIG. 10 shows another feature that can be used with the invention of this application. The resilient clip used with the clamp 25 has a different configuration. The resilient clip 89 has a barb 87 location on each end of resilient legs 93 that extend from the center section 91 of the resilient clip. The barb 87 is in the shape of hook 91 that extends over the side of the legs 93 that faces the top bracket 27. The hook 91 is disposed on the legs 93 to engage the end 85 of the bracket 79 when the solar modules are in the second position. The hook acts to retain the solar modules in the desired second position by engaging the end 85 of the bracket 79 that is secure to the solar module. The resilient clip 89 of FIG. 10 functions in the same manner as the previously described clip 49.

FIGS. 11, 12, 13 and 14 show another feature for the resilient clip of the invention. The clip 105 of this mounting system has a center portion 110 with an opening 112 that is positioned on the end of the bolt 33 in the manner previously described. Tabs 114 extend from the center portion and engage alignment slots 78 on the mounting plate 21 of the mounting rack 15. The tabs have the same shape and size as the previously described grounding tabs 59. The engagement between the tabs 114 and the mounting plate prevent the clip 105 from rotating with respect to the mounting plate. Resilient legs 115 extend from the side of each end of the center portion. The resilient legs 115 are disposed in opposed parallel relationship on each end of the center section. The resilient legs extend from about one inch to about two inches from the center portion 110. A section 116 extends from one side of the center portion beyond the resilient legs 115 on that side of the center portion. A barb 119 is located on the end 121 of each resilient leg 115. The barbs extend at an angle from about one inch to about 2 inches from the end of each of the resilient legs 115. The barbs are disposed to extend in a direction towards the opposed resilient legs positioned on the same end of the center portion 110. The barbs are designed to engage a shoulder 121 on the solar modules, allow the solar modules to be positioned in a desired location and to be secured to the mounting rack 15 by advancing the top bracket 27 towards the solar modules 9 in the manner previously described.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A mounting system for solar module comprising:
   a mounting rack, having a mounting plate to support a solar module, positioned on a structure;
   a clamp secured to the mounting rack, the clamp having a top bracket for positioning on an upper surface of the solar module and a resilient clip for positioning on a lower surface of the solar module, the resilient clip being operatively connected to the top bracket, the clip having a center portion and resilient legs that extend from each side of the center portion, at least one barb being positioned on each resilient leg, the at least one barb designed to engage a shoulder on the lower surface of the solar module to maintain the solar module in the desired position with respect to the clamp, the top bracket having an aperture and the resilient clip having an opening, a bolt passes through the aperture in the top bracket and the opening in the clip to connect the top bracket and the clip of the clamp, and a spring is positioned around a portion of the bolt that is located between the top bracket and the clip, the spring resiliently biasing the top bracket and the clip in a desired spaced apart position.

2. The mounting system of claim 1 wherein the clip is made from spring steel and the resilient legs extend from the center portion in a direction towards the top bracket.

3. The mounting system of claim 2 wherein the resilient legs are disposed at an angle from about 20 degrees to about 30 degrees with respect to the center portion.

4. The mounting system of claim 1 wherein the spring provides a resilient biasing force that separates the top bracket and the clip.

5. The mounting system of claim 4 wherein the top bracket has flanges that extend from two sides of the top bracket, the flanges disposed for engaging a surface of the solar module.

6. The mounting system of claim 5 wherein a nut is positioned on the end of the bolt that extends beyond the resilient clip.

7. The mounting system of claim 6 wherein the resilient clip has at least one grounding tab, the at least one grounding tab being disposed to engage the mounting plate.

8. The mounting system of claim 7 wherein the mounting plate has at least one alignment slot disposed for receiving the at least one grounding tab.

9. The mounting system of claim 8 wherein the mounting plate has at least one keyhole-shaped opening, the at least one keyhole-shaped opening having a circular section with a slot extending from the circular section, the circular section being configured to accept the nut on the end of the bolt and the slot being configured to accept the bolt, the slot having a width that is less than the diameter of the nut.

10. The mounting system of claim 9 wherein the top bracket has a hollow portion and the bolt has a head, the head of the bolt disposed to engage an upper surface of the top bracket.

11. The mounting system of claim 10 wherein a safety spring is positioned on the top bracket, the safety spring having a U-shaped portion and a resilient flange that extends from the U-shaped portion, the resilient flange extending over an upper surface of the top bracket.

12. The mounting system of claim 11 wherein a leg of the U-shaped portion extends into the hollow portion of the top bracket to position the safety spring with respect to the top bracket.

13. The mounting system of claim 12 wherein the resilient flange extends from a leg of the U-shaped portion that is not positioned in the hollow portion of the top bracket.

14. The mounting system of claim 13 wherein the resilient flange has an opening, the opening disposed to be positioned around the head of the bolt, the resilient flange can be displaced in a direction towards the top bracket to provide access to the head of the bolt.

15. The mounting system of claim 14 wherein the opening in the resilient flange has opposed sides, the opposed sides disposed for engaging the head of the bolt to prevent the bolt from being rotated when the resilient flange is in an undisplaced position.

16. The mounting system of claim 1 wherein the at least one barb is in the shape of a hook that extends in a direction towards the center portion of the resilient clip.

17. The mounting system of claim 1 wherein a plurality of barbs are positioned on each resilient leg.

18. The mounting system of claim 17 wherein the plurality of barbs extend from the resilient clip in a direction towards the top bracket.

19. The mounting system of claim 18 wherein the plurality of barbs extend from the resilient clip from a distance from about 0.25 of an inch to about 0.75 of an inch.

20. A mounting system for a solar module comprising:

a mounting rack, having a mounting plate to support a solar module, positioned on a structure;

a clamp secured to the mounting rack, the clamp having a top bracket for positioning on an upper surface of the solar module and a resilient clip for positioning on a lower surface of the solar module, the resilient clip being operatively connected to the top bracket, the clip having a center portion and resilient legs that extend from each side of the center portion; the resilient legs of the clip are projections that extend from the center portion in a direction towards the top bracket, the resilient legs being disposed to be substantially perpendicular to the center portion; at least one bar being positioned on each resilient leg, the at least one barb extends from an end of the resilient legs that is spaced apart from the center portion; the resilient legs are positioned in opposed parallel relationship from each end of the center portion; the at least one barb extends from the resilient leg in a direction towards the opposed resilient leg; and the at least one barb designed to engage a shoulder on the lower surface of the solar module to maintain the solar module in the desired position with respect to the clamp.

\* \* \* \* \*